United States Patent [19]
Baronowsky

[11] Patent Number: 5,252,970
[45] Date of Patent: Oct. 12, 1993

[54] ERGONOMIC MULTI-AXIS CONTROLLER

[76] Inventor: David Baronowsky, 33 Florence Ave., Massapequa, N.Y. 11758

[21] Appl. No.: 648,150

[22] Filed: Jan. 30, 1991

[51] Int. Cl.[5] .................................... G05G 9/047
[52] U.S. Cl. .................................. 341/20; 345/161; 345/164
[58] Field of Search ............... 341/20; 340/706, 709, 340/710; 200/6 A; 273/148 B; 74/471 XY

[56] References Cited

U.S. PATENT DOCUMENTS

| | | | |
|---|---|---|---|
| 2,929,258 | 3/1960 | Mackway | 74/471 |
| 2,939,332 | 6/1960 | Peterson | 74/471 |
| 3,269,190 | 8/1966 | Laman | 74/471 |
| 3,304,434 | 2/1967 | Koster | 250/231 SE |
| 3,395,589 | 8/1968 | Gersten | 74/471 |
| 3,541,521 | 11/1970 | Koster | 340/710 |
| 3,625,083 | 12/1971 | Bose | 74/471 X |
| 3,643,148 | 2/1972 | Brown et al. | 318/628 |
| 3,760,320 | 9/1973 | Oka et al. | 74/471 X |
| 3,770,915 | 11/1973 | Bennett et al. | 200/6 A |
| 3,789,218 | 1/1974 | Blount | 250/231 SE |
| 3,792,243 | 2/1974 | Appel et al. | 235/151 |
| 3,821,498 | 6/1974 | Schaefer, Jr. et al. | 200/6 A |
| 3,886,361 | 5/1975 | Wester | 250/338 |
| 3,987,685 | 10/1976 | Opocensky | 74/471 R |
| 4,016,775 | 4/1977 | Carlson | 74/471 X |
| 4,026,048 | 5/1977 | Hill et al. | 200/6 A |
| 4,250,378 | 2/1981 | Mutton | 250/221 |
| 4,264,903 | 4/1981 | Bigelow | 178/19 |
| 4,281,561 | 8/1981 | Groskopfs | 74/471 X |
| 4,291,213 | 9/1981 | Felland et al. | 200/6 A |
| 4,301,326 | 11/1981 | Hetzel et al. | 178/18 |
| 4,404,865 | 9/1983 | Kim | 74/471 X |
| 4,464,652 | 8/1984 | Lapson et al. | 340/710 |
| 4,465,908 | 8/1984 | Griffith et al. | 200/5 R |
| 4,502,355 | 5/1985 | Mitch | 340/709 |
| 4,533,830 | 8/1985 | Beauprey | 250/231 SE |
| 4,538,476 | 9/1985 | Luque | 74/471 X |
| 4,550,221 | 10/1985 | Mabusth | 178/18 |
| 4,564,079 | 1/1986 | Moore et al. | 178/18 |
| 4,580,006 | 4/1986 | Hull | 178/18 |
| 4,581,609 | 4/1986 | Hosogoe et al. | 340/710 |
| 4,589,810 | 5/1986 | Heindl et al. | 414/5 |
| 4,628,755 | 12/1986 | Hawley | 74/471 X |
| 4,633,167 | 12/1986 | Kitts | 340/709 |
| 4,654,647 | 3/1987 | Wedam | 340/709 |
| 4,736,191 | 5/1988 | Matzke et al. | 340/709 |
| 4,738,417 | 4/1988 | Wenger | 74/471 X |
| 4,739,128 | 4/1988 | Grisham | 340/709 |
| 4,786,892 | 11/1988 | Kubo et al. | 340/710 |
| 4,801,931 | 1/1989 | Schmidt | 340/710 |
| 4,862,165 | 8/1989 | Gart | 341/20 |
| 4,866,602 | 9/1989 | Hall | 340/710 |
| 4,881,065 | 11/1989 | Soma et al. | 340/710 |
| 4,887,230 | 12/1989 | Noguchi et al. | 340/560 |
| 4,913,573 | 4/1990 | Retter | 340/710 |
| 4,939,508 | 7/1990 | Lawrence et al. | 340/709 |
| 4,952,919 | 8/1990 | Nippoldt | 340/710 |
| 5,021,771 | 6/1991 | Lachman | 341/22 |
| 5,078,019 | 1/1992 | Aoki | 340/710 X |

Primary Examiner—Donald J. Yusko
Assistant Examiner—Michael Horabik
Attorney, Agent, or Firm—Dilworth & Barrese

[57] ABSTRACT

A manually operated ergonomic multi-axis controller such as those used for controlling cursor position along x and y axes and for entering x, y and/or z coordinate information into a computer or the like. The housing includes a distal end portion angled with respect to the upper surface and the base of the housing to conform to the natural curvature of the human hand. The primary actuator, such as a trackball or joystick is positioned at the distal end portion. Secondary actuators are located along the sides of the housing.

19 Claims, 12 Drawing Sheets

ERGONOMIC MULTI-AXIS CONTROLLER

BACKGROUND OF THE INVENTION

Field of the Invention

This invention relates to a manually operated multi-axis controller such as those used for controlling position along x and y axes, and more particularly it relates to an ergonomic multi-axis controller for entering x, y, and/or z coordinate information into a computer or the like.

Background of the Art

Multi-axis controllers are known in the art. One type of controller employs a freely rotatable control sphere or ball as the primary actuator for generating x, y coordinate information. A familiar type of ball controller is the computer "mouse". This device is a manually operated controller which is intended to be moved along a flat surface, such as a table or desk top. The control ball is located at the bottom of the device and contacts the flat surface. When the mouse is moved along the surface, the control ball rotates, and encoders within the mouse detect motion of the ball around x and y axes. A signal is thereby generated and transmitted to the computer, usually for directing the position of a cursor on a monitor screen. For example, mice, as well as the other types of controllers described below, are often used in conjunction with computer graphics software, desk top publishing, and software which generates multiple data screens or "windows". Like other types of controllers, mice usually have secondary actuators which allow the operator to perform one or more additional functions after the cursor has been moved to the desired location on the screen. Secondary actuators are usually of the push button type.

Another controller using a spherical primary actuator is the "trackball" type device. As with the mouse, x, y coordinate control is achieved by the rotational movement of a freely rotatable ball. A trackball may be thought of as an inverted mouse. Unlike the mouse, however, the trackball's primary actuator is on the top of the device and is rotated directly by the hand of the operator. The device is intended to be stationary. This device is advantageously used when desk space is limited. The control ball rests on a suitable suspension, and dependent or independent x and y coordinate pickups (or "pick-ups") are contacted to the ball. A pickup includes a shaft which rotates in accordance with the respective rotation of the ball, and an encoder for generating a signal from the rotation of the pickup shaft.

Yet another type of controller uses, as a primary actuator, a control stick or "joystick". The joystick is pivoted in x and/or y coordinate directions, and encoders in the device generate signals accordingly.

The reader is directed to the following references for more information regarding the art:

U.S. Pat. No. 3,269,190 discloses a position control ball assembly, i.e. a trackball type device, which provides a mounting ring for supporting the control ball. The mounting ring is fabricated from a low friction material such as polytetrafluoroethylene, or "TEFLON".

U.S. Pat. No. 3,395,589 discloses an apparatus for converting the universal motion of a sphere into respective movements of output members located in mutually perpendicular planes.

U.S. Pat. No. 4,404,865 discloses a trackball device containing rotatable shaft supports for the control ball, a portion of the control ball projecting through an opening in the housing for manual rotation by a user. Bias springs urge the shaft bearings, and therefore the shafts and ball, toward the opening in the housing.

U.S. Pat. No. 4,538,476 discloses a trackball type controller having othogonally spaced rotatable traction wheels for supporting the control ball at two points substantially at the horizontal equator of the ball, and a rolling bearing positioned generally equidistantly between the traction wheels to frictionally support the ball at a point substantially below the horizontal equator of the ball U.S. Pat. No. 4,464,652 discloses a "mouse" type cursor control device. The control ball is in contact with rotatable shafts, each shaft being coupled to an encoder disk having radial slots for interrupting a light beam transmitted between a photoemitter and a photodetector.

U.S. Pat. No. 4,628,755 discloses a mouse having, instead of a control ball, a rotatable drive element for contacting the planar surface over which it is moved. The drive element located on a shaft which is rotatable around an axis oriented at less than 90° to the planar surface.

U.S. Pat. No. 4,862,165 discloses an ergonomically shaped mouse. The upper surface of the housing is configured to provide support for the surfaces of the hand.

U.S. Pat. Nos. 3,760,320, 2,929,258 and 2,939,332 disclose joystick type mechanisms.

U.S. Pat. No. 4,250,378 describes a photoelectric joystick including means for detecting the location of a shadow cast by a portion of the joystick.

One of the problems associated with the prior known devices is the lack of suitable support for the operator's hand. Mice require the movement of the operator's arm, and trackballs do not present the primary and/or secondary actuators to fit the natural orientation and configuration of the human hand. After an extended period of time, operators become fatigued by continuous use of such devices.

A problem associated with the prior known trackball devices is that they require actuation from the top of the ball. This is due to the fact that the suspension, which supports the ball from somewhat below the horizontal equator, lies in a plane which is substantially perpendicular to the direction of the pull of the gravity field. This configuration limits the trackball's applications to those environments where the trackball controller is substantially horizontal with respect to a gravity field. Under these circumstances an operator must adapt himself to the operation of the device expending additional energy to support or position the hand or even the entire arm to properly interact with the device's actuators. To alleviate these problems I have invented a multi-axis controller which supports and fits the natural orientation of the human hand and which can accommodate a variety of actuators. Further, I present two basic variations of actuation. The first, utilizing actuation of a sphere, demonstrates a suspension of the sphere to accommodate the basic invention and with additional modification offers a unique and more generally applicable capability of operating in any arbitrary position with respect to gravity or the absence thereof. The second, which is roughly equivalent to a joystick, works in planar orientation and offers the ability to return to a rest position.

SUMMARY OF THE INVENTION

An ergonomic manually operable multi-axis controller is provided which includes a housing having a surface for contacting and providing support for the palm of the user's hand, and at least one primary actuator located at the distal end of the housing and positioned such that the primary actuator presents a surface for actuation by any of the fingers of the operator's hand exclusive of the thumb.

In a desk top type embodiment of the invention, the multi axis controller includes a housing having a base, and an upper portion having a forward access face. The primary actuator for generating spatial coordinate information has a presentation angle for operator access of from about 0° to 70°. Means are included for retaining the primary actuator at the forward access face at the presentation angle. The controller also includes pickup means for generating and transmitting a signal in response to actuation of the primary actuator.

The primary actuator can be a freely rotatable control sphere or a joystick type controller which is movable. The spherical primary actuator is supported by rotatable contact means at first, second, third and optionally fourth contact points on the surface of said spherical primary actuator. The contact points are spaced apart in relative relationship so as to generally define a tetrahedron, each side of which is smaller in length than the diameter of the spherical primary actuator.

BRIEF DESCRIPTION OF THE DRAWINGS

Preferred embodiments of the invention are described hereinbelow with reference to the drawings wherein.

DETAILED DESCRIPTION OF PREFERRED EMBODIMENTS

The present invention relates to an ergonomic multi-axis controller. The desk top type embodiment of the present invention may be actuated by various types of primary actuators, such as control spheres, joysticks, control panels having touch sensitive surfaces, etc. With respect to the control sphere, a unique three-point suspension system is presented herein which improves contact between the pickup shafts and the control sphere, and with the addition of a fourth contact point enables the multi-axis controller to be operated in any orientation with respect to gravity or in a zero gravity environment. Moreover, the control sphere suspension system allows the control sphere to be employed in, for example, vertical panel systems rather than horizontal panels.

One embodiment of the present invention relates to a device for converting the universal movement of a sphere into respective movements of output members located in mutually perpendicular planes.

A control ball or sphere functions as the primary actuator A primary actuator is the means by which the user of the multi axis controller inputs information as to x and/or y coordinate data. Typically, the user, or operator moves the primary actuator (by rotating, pressing, etc.) and the direction and/or speed of movement is sensed by the controller which converts the movement to signals (electrical, optical, etc.) for transmission to, for example, a computer. Secondary actuators are means by which the operator performs one or more functions at an x, y coordinate location. For example, with a computer program which generates various icons on a monitor screen, the primary actuator allows the operator to move the cursor to a particular icon and the secondary actuator allows the operator to choose to perform the function of that icon.

The control sphere is freely rotatable and mounted within a support structure having at least three contact points. These contact points are provided by rotatable shafts and/or bearings having axes of rotation lying in at least two different planes and preferably three respectively different planes.

In yet another alternative, the control sphere is mounted within a support structure which provides four contact points spaced apart in relative relationship so as to define a tetrahedron shaped "pocket" for supporting the control sphere. The significance of this configuration is that the control sphere is not dependent upon gravity to be retained within the pocket. A multi-axis controller using this configuration may therefore be used in environments where the controller is not horizontal (i.e. vertical or upside down), or in zero gravity environments. This is in contrast to prior known trackballs in which the control sphere rests on contact points within the controller such that the sphere loses contact of the x and y pickups if held at a steep angle or upside down.

Figure 1:
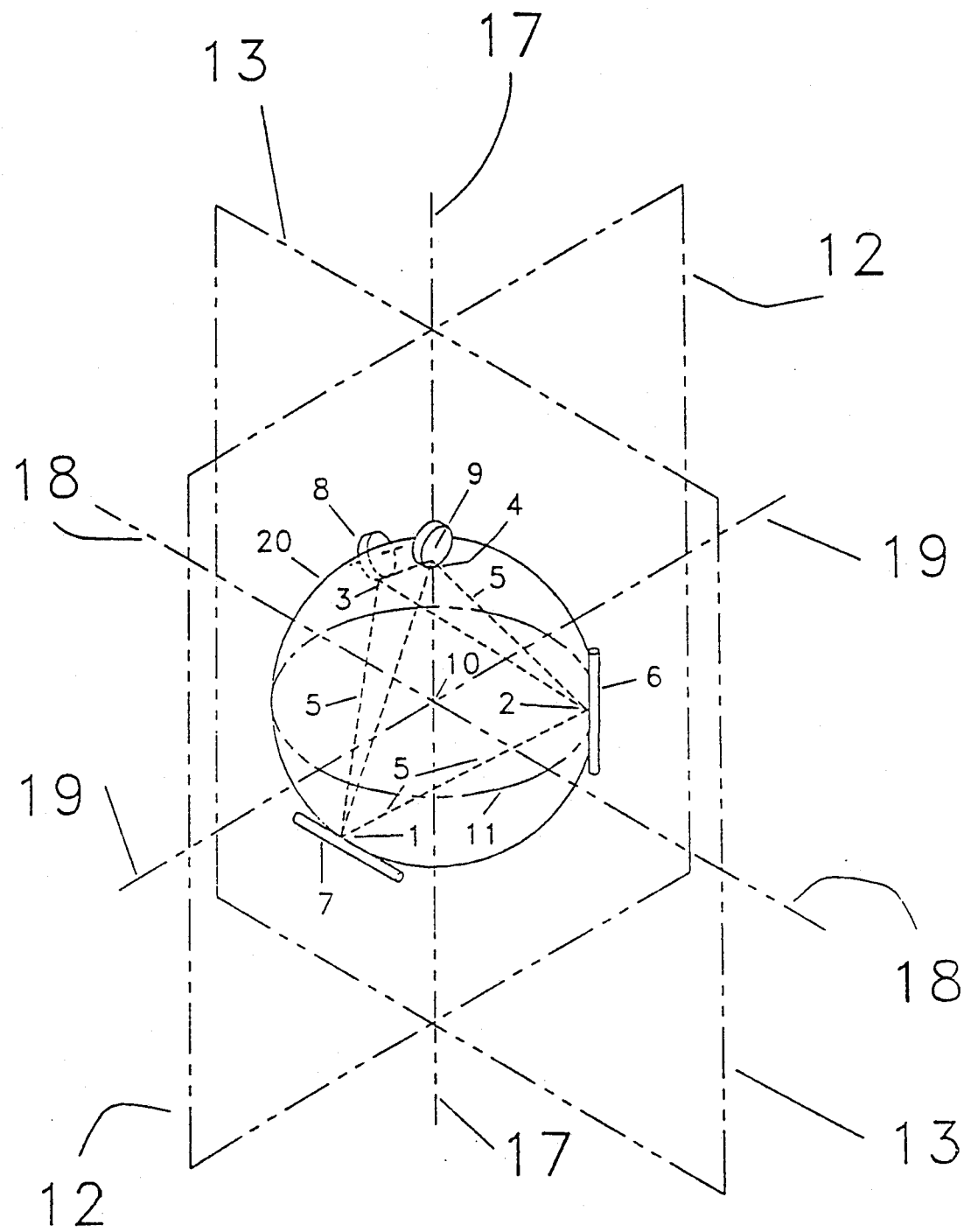
FIG. 1 is a perspective view diagrammatically illustrating the spatial orientation of the control sphere with respect to contact points.

FIG. 1 illustrates the configuration for supporting the spherical primary actuator for such a multi-axis controller. Control sphere 20 is supported by rotatable contacting means at first, second, third, and fourth contacting points 1, 2, 3, 4, respectively, on the surface of the sphere 20. The first contacting means is a rotatable pick-up 7 axially oriented parallel to the y axis of rotation 18 of the control sphere. Rotation of the sphere around y axis 18 generates information about movement in the y direction. The second contacting means is a rotatable pick-up 6 axially oriented parallel to the x axis of rotation 17 of the control sphere. Rotation of the sphere around x axis 17 generates information about movement in the x direction. The third contacting means is a rotatable roller bearing 8. The fourth contacting means is a roller bearing 9 having at least one axis of rotation which is oriented parallel to the y axis 18. The first, second, third and fourth contact points are spaced apart in relative relation so as to generally define a tetrahedron 5.

In order to more specifically define the relative orientation of the contacting points with respect to the sphere, it should be noted that the control sphere 20 is freely rotatable around center point 10, and sphere 20 is characterized by a first plane or equatorial plane 11 which defines upper and lower hemispheres of sphere 20, a second plane 12 which is oriented perpendicularly to said first plane and which defines left and right hemispheres of sphere 20, a first axis of rotation 17, i.e., an x axis of rotation extending in perpendicular relationship to said first plane 11, a second axis of rotation, i.e., y axis 18 extending in perpendicular relationship to the second plane 12 and intersecting the first axis 17 at centerpoint 10. Equatorial plane 11 need not be horizontal, as will be seen below. Line 19 represents a spatial coordinate in the Z direction perpendicular to both the x and y axes.

The first and second axis of rotation 17, 18, respectively, define a third plane 13 which is oriented perpendicularly to both of the first and second planes, 11, 12 respectively, and which defines distal and proximal hemispheres of the control sphere 20.

The planes and axes described above are geometric characteristics and not physical characteristics of sphere 20. For example, the x and y rotational axes, 17 and 18, respectively, define plane 13. The x and z axes, 17 and 19, respectively, define plane 12. The y and z axes, 18 and 19, respectively, define plane 11. Hence, rotation of the sphere does not by itself involve rotation of the planes and axes.

A first contacting means 7 contacts and supports the control sphere 20 at a point 1 located within the region where the distal and lower hemispheres of the primary actuator are co-extensive, and a second contacting means 6 contacts and supports the control sphere 20 at a point 2 located in a region where the left and proximal hemispheres of the control sphere 20 are coextensive. Contact point 2 is preferably located in close proximity to equatorial plane 11.

A third contacting means 8 contacts and supports the control sphere 20 at a point 3 located in a region where the right, proximal and upper hemispheres of the control sphere 20 are co-extensive.

A fourth contacting means 9 contacts and supports the control sphere 20 at a point 4 located in the upper hemisphere of the control sphere 20 in proximity to the x axis 17 of rotation.

Figure 2:
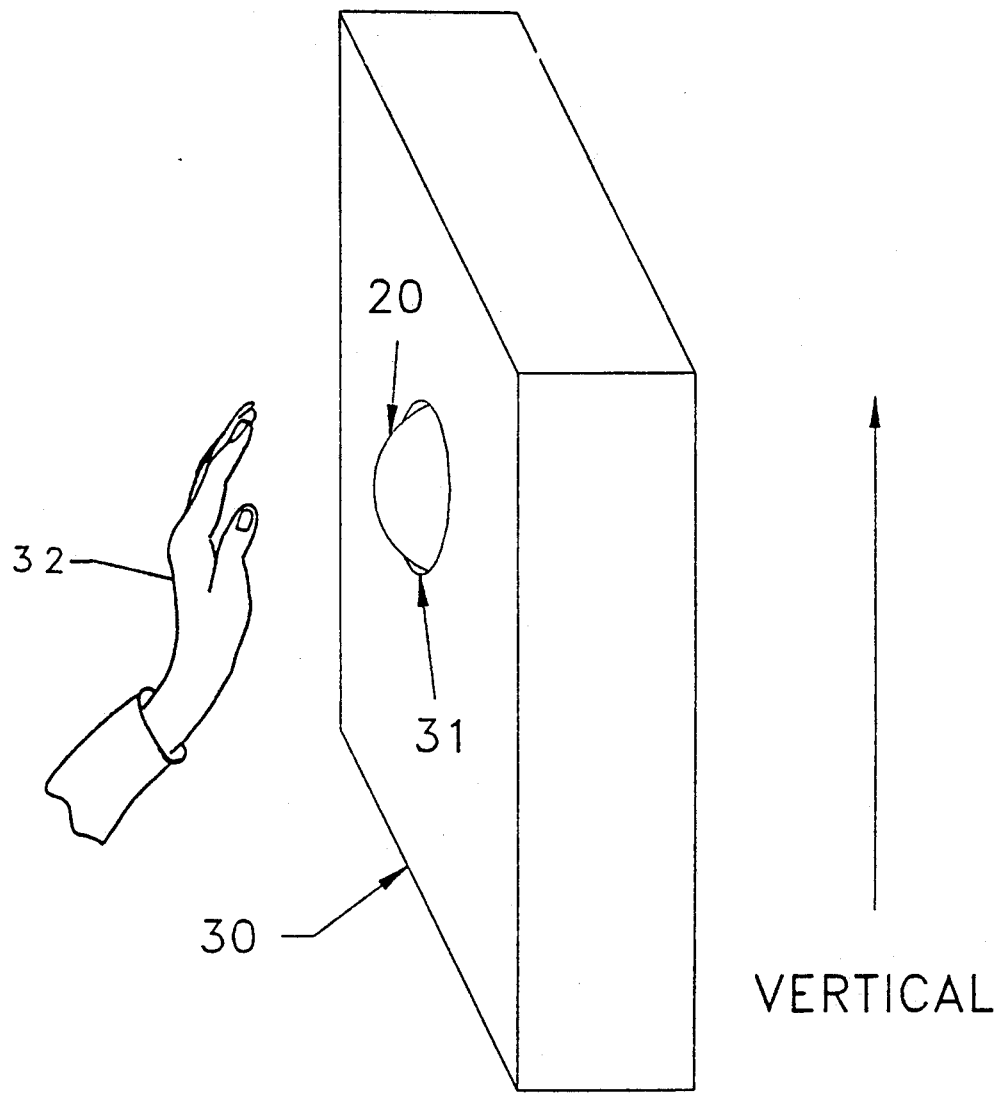
FIG. 2 is an illustration of an embodiment of the present invention for use in vertical control panels.

The above described configuration of contact points generally defines a tetrahedron 5, each side of which is smaller in length than the diameter of control sphere 20. Thus, control sphere 20 is mounted within a "pocket" which supports the sphere 20 in any gravitational orientation, or in environments where there is no gravity. A control sphere supported in this manner can be housed in vertical panels in applications where horizontal space is limited. FIG. 2 illustrates a multi-axis controller 30 housed in a vertical panel arrangement. Control sphere 20 extends beyond aperture 31 so as to present an area of its surface for actuating contact by the operator's fingers 32. This area is designated herein as the "presentation surface".

Figure 1A:
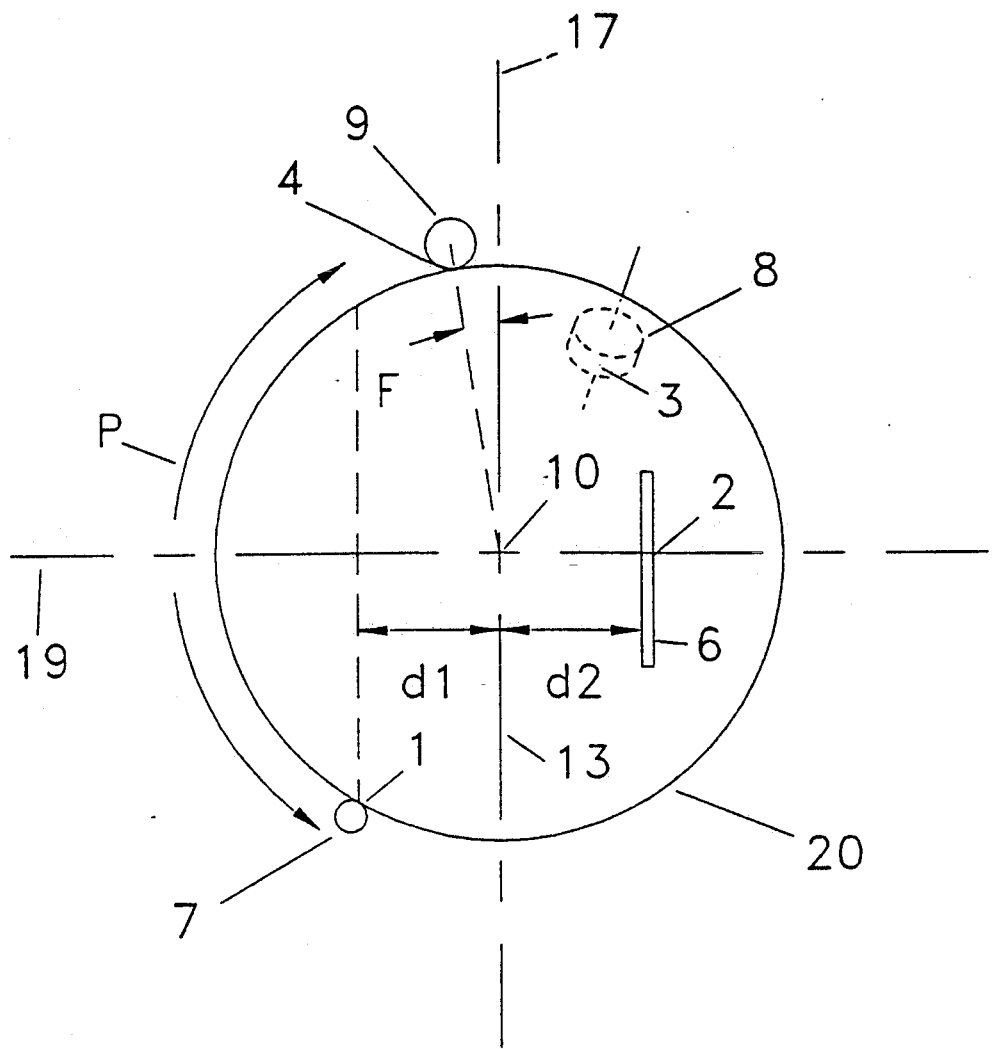
FIGS. 1a and 1b are, respectively, side and front elevational views diagrammatically illustrating the control sphere and the orientation of its support means.
Figure 1B:
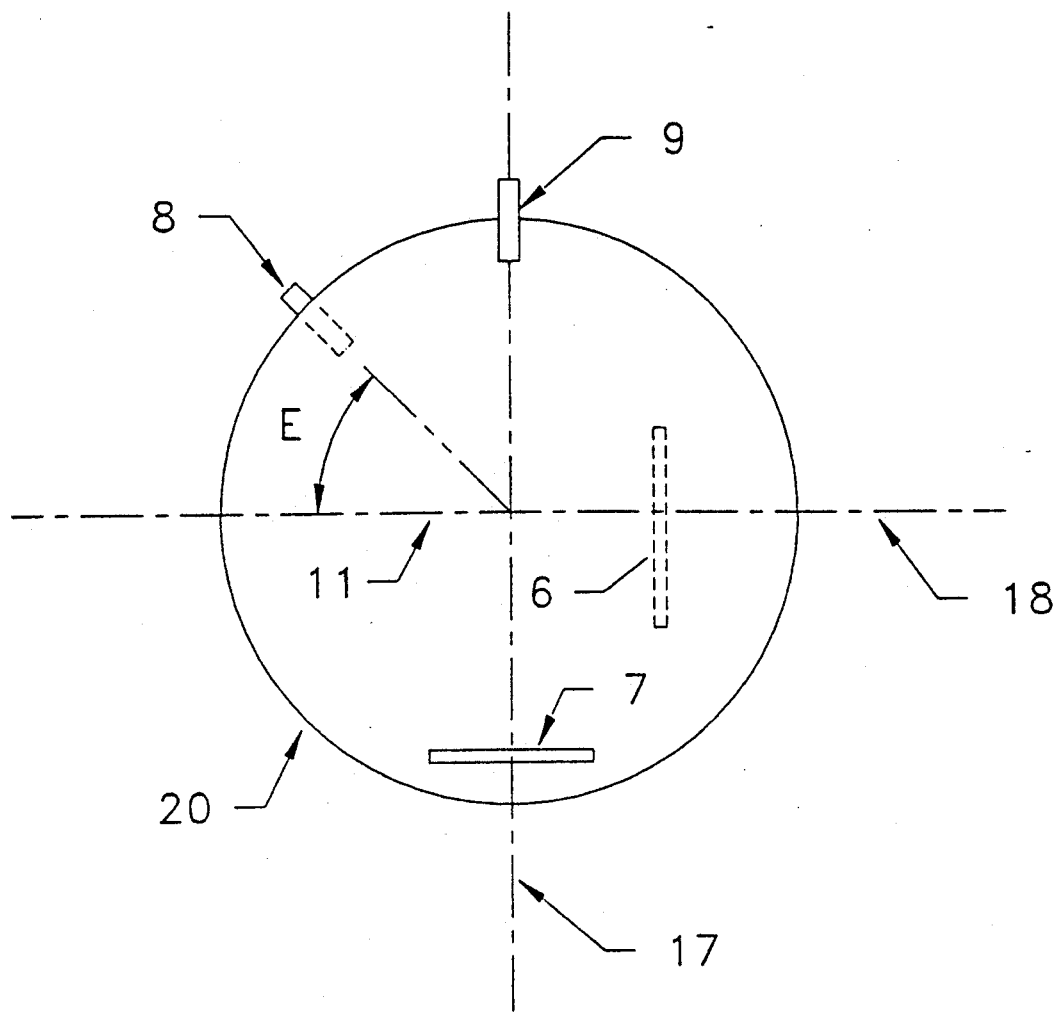

FIGS. 1a and 1b are further diagrammatic illustrations of a preferred embodiment of the present invention. FIG. 1a shows a side elevational view. FIG. 1b shows a front elevational view.

First contact means 7 is a rotatable shaft of a y pickup. The y pickup detects motion in the y axis direction as the control sphere 20 rotates around the y axis, i.e. rotational axis 18.

Second contact means 6 is a rotatable shaft of an x pickup which detects motion in the x direction as control sphere 20 rotates around the x axis, i.e. rotational axis 17. A feature of the present invention is that the first and second contact points 1 and 2 of the first and second contact means 7 and 6, respectively, are spaced apart from the third plane 13. Contact point 1 is distally spaced apart from plane 13 by distance $d_1$. Contact point 2 is proximally spaced apart from plane 13 by distance $d_2$. Preferably, $d_1$ is substantially equal to $d_2$.

Third contacting means 8 is preferably a bearing located proximally to the plane 13 and above equatorial plane 11 at an angle E wherein E can be from 0° to 90°. In order to inhibit the control sphere from "riding up" in the support structure when the operator rotates the ball upward, it is preferable to locate bearing 8 such that angle E is from 20° to 70° and preferably from 40° to 50°.

It should be noted that the rotational axes of shafts 6, 7 and 8 lie in respectively different geometric planes. For example, there is no plane which contains the rotational axes of both the x, and y pickup shafts 6 and 7 or of all three contact means 6, 7 and 8. The configuration substantially improves contact between the control sphere and the pickup shafts. More particularly, the tendency of the control sphere to "ride up" in the suspension system when vigorously actuated is substantially reduced.

The presentation surface P extends around the distal most segment of the control sphere and, as mentioned above, is the area of the surface of the control ball 20 which is presented for actuating contact by the operator's fingers.

Figure 1C:
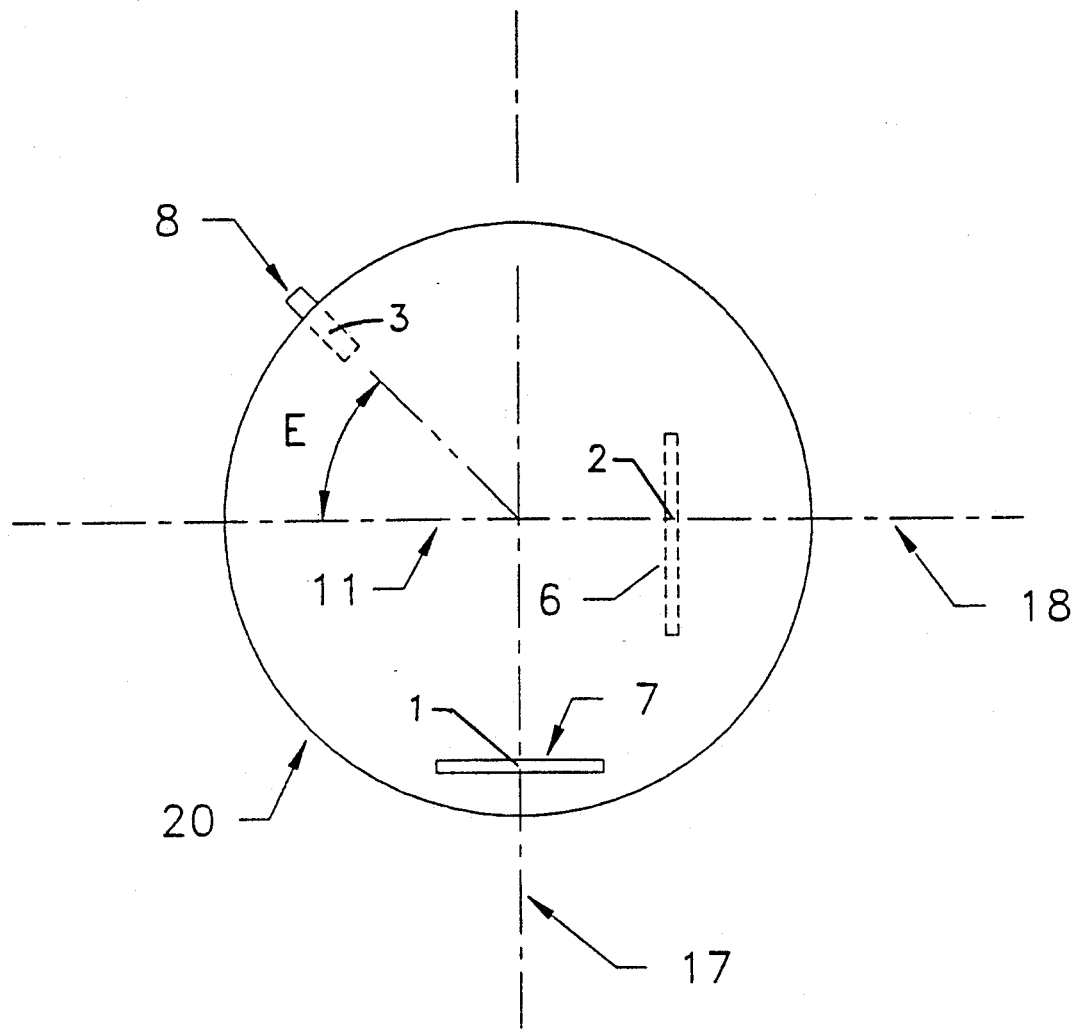
FIG. 1c illustrates a front elevational view diagrammatically illustrating a three point suspension system.

Referring to FIG. 1c, it should be noted that the present invention will operate with three contact means, i.e. 6, 7 and 8. The pocket formed by the three contact means will retain the control ball in all orientations of the apparatus in which the triangular plane defined by points 1, 2 and 3 extends below the centerpoint of mass 10. Hence, the fourth contact means 9 is optional and not mandatory for the operation of the invention. However, contact means 9 is preferred when it is desired to operate the apparatus of the present invention in a gravity field in any orientation including orientations in which the center of mass 10 is not positioned above any portion of the triangular plane defined by contact points 1, 2 and 3, and when it is desired to operate the apparatus in the equivalent of a zero gravity field, for example in spacecraft.

Fourth contacting means 9, is preferably located at the top of the control sphere in the vicinity of the x axis of rotation 17. Although contact point 4 can be directly aligned with axis 17 it has been found to be advantageous to locate contact means 9 a little bit distally of axis 17 so as to define an angle F with plane 13. Angle F can be from about 0° to about 15°, and is preferably about 1° to about 5°. Greater holding power is achieved so that the control ball is more securely maintained. Although this position creates more drag when the control ball is rotated around x axis 17 than if the fourth contact means were located directly at axis 17, it has unexpectedly been found that a small amount of drag is beneficial for maintaining a balance in the drag forces.

It is possible, using the above described support system, to construct an ergonomic multi-axis controller for desk top applications and the like. Such a controller is illustrated in FIGS. 3, 3a, 4a, and 5.

Referring to FIGS. 3, 3a, and 4, and 4a multi-axis controller 40 comprises a base 41 and an upper portion 42. Upper portion 42 includes a top surface 44 and a distal or front access face 43 having an aperture 43a. The primary actuator is a substantially spherical control ball 46 (corresponding to control sphere 20 of FIGS. 1, 1a and 1b) which is mounted at the front access face 43 such that a portion of the control ball 46 (the presentation surface) extends through aperture 43a to allow manual contact for actuation, i.e. movement of the control ball 46 which is freely rotatable. Control ball 46 is mounted by means of support frame 47 which includes three distally projecting rigid arms 51a, 51b, and 51c, each of which contains bearings at their distal end for rotatably mounting the control ball contact supports. One contact support is provided by x axis pick-up shaft 53 (corresponding to contact means 6 of FIGS. 1, 1a and 1b) which is rotatably mounted at two points by bearings 52 and extends between two of the arms, 51a and 51b. The x axis pick-up shaft 53 contacts the surface of control sphere 46 at a point 53a (corresponding to second contact point 2 of FIG. 1) approximately midway between the bearings 52 in arms 51a and 51b. The x axis pick-up shaft has an encoder 54 at the end of the shaft.

The x pick-up is axially oriented in parallel relationship to the x axis of rotation of the control sphere 46. See, for example, FIG. 1 in which x axis of rotation 17 extends vertically through the center point 10 of the sphere, and contact means 6 is oriented parallel thereto. The x axis of rotation of control ball 46 in controller 40, however, is preferably oriented at angle B from vertical (base 41 defining the horizontal). Angle B can be from 0° to 70° but is preferably from 5° to 30° and more preferably from 10° to 20° X axis pick-up 53 is, therefore, also inclined from vertical angle B. Moreover, the x and y axes define a plane (see plane 13, FIG. 1) which is also oriented at angle B, or, in other words, at an angle of from 20° to 90° from horizontal, preferably 60°-70°, and more preferably 65°-70° from horizontal.

The z-coordinate axis 19 (see also FIG. 1) extends outward at angle C which is equal in magnitude to angle B. The primary actuator, i.e. control ball 46, is effectively presented to the operator at an angle off horizontal, which is designated herein as a presentation angle.

The presentation angle, i.e. the angle at which the control sphere is "presented" to the user for actuating contact, is defined as the angle at which the z-coordinate axis is inclined from horizontal. In the present embodiment, as indicated above, the presentation angle, i.e. angle C, can range from 0° to 70°. In contrast, conventional trackballs known in the art are operated from above and therefore have an angle of presentation of 90°.

Referring again to FIGS. 3 and 4, an arm 51c extends distally from carriage 47 at the side of control ball 46 laterally across from x axis pick-up 53. Support roller 58 (corresponding to third contact means 8 as shown in FIGS. 1, 1a and 1b) is rotatably by means of axle 58b mounted at the distal end of arm 51c and contacts control sphere 46 at point 58a (corresponding to third contact point 3 as shown in FIGS. 1 and 1a) such that the lateral distance between points 58a and 53a is less than the diameter of control ball 46 so as to prevent the control 46 from falling backwards. In other words, x pick-up 53 and support roller 58 each contact control sphere 46 at respective points proximal to the plane defined by the x and y rotational axes of control sphere 46. See for example, FIG. 1 wherein points 2 and 3 are located proximally to plane 13. Also, support roller 58 is inclined so as to contact the control ball at an angle E as discussed more fully with respect to FIG. 1b. Support roller 58 is depicted as being cylindrically shaped and rotatable around a single axis. However, as an alternative, support roller 58 can be a spherical ball roller which is freely rotatable and amounted in any appropriate support which is standard for spherical rollers. Y axis pick-up shaft 55 (corresponding to first contact means 7 as shown in FIGS. 1, 1a and 1b) is rotatably mounted on upstanding support arms 57 by means of bearings 52. Y encoder 56 is located at one end of the Y axis pick-up shaft 55. Shaft 55 is axially oriented in parallel relationship to the Y rotational axis of the control ball 46. See for example FIG. 1, wherein y rotational axis 18 extends through the center 10 of sphere 20.

Y pick-up 55 contacts control ball 46 at a point 55a (corresponding to first contact point 1 of FIG. 1) below the equatorial plane and distal to the x rotational axis 17 of the control ball 46.

Figure 3:
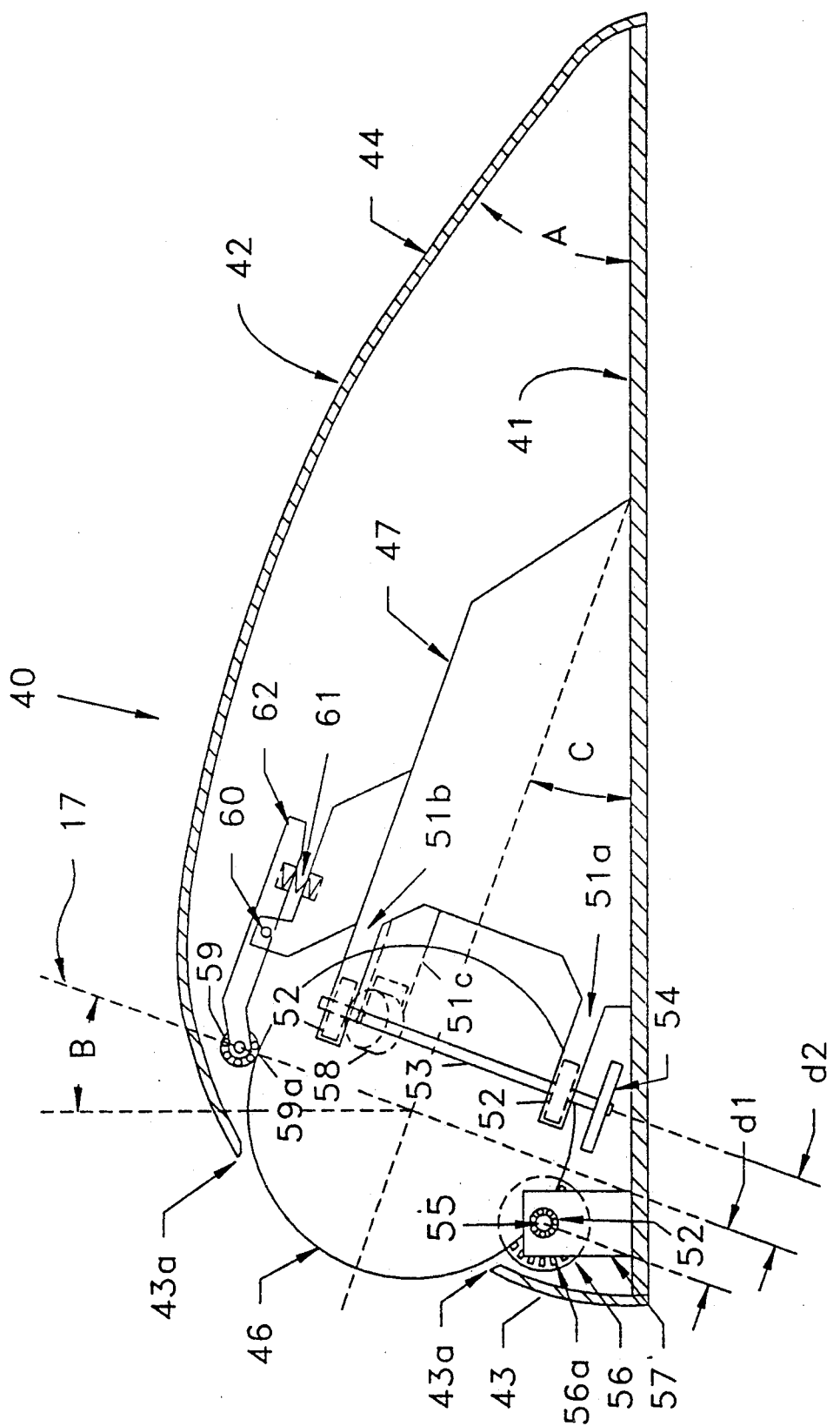
FIGS. 3 and 4 respectively are a cut away side elevational view, a cutaway front elevational view, and a cutaway plan view of a desk top embodiment of the present invention employing a trackball.

Support roller 59 contacts the surface of the control ball 46 at point 59a (corresponding to fourth contact point 4 as shown in FIGS. 1 and 1a) which may be at the top of ball in line with x axis 17, as shown in FIG. 3, or more preferably, slightly distal to the x axis as discussed above with respect to FIG. 1a.

Support roller 59 (corresponding to fourth contact means 9 as shown in FIGS. 1, 1a and 1b) may be a cylindrical type roller, rotatably mounted by bearings 52 such that it rotates around a single axis, or it may be a ball roller in an appropriate standard mounting. Support roller 59 is preferably mounted on a pivotally supported rocker arm 62 which is biased by compression spring 61 so as to keep support roller 59 in contact with control sphere 46. Spring biasing as illustrated permits the control ball 46 to be removably inserted into the tetrahedronal pocket as diagrammed in FIG. 1, yet remain securely in place. Preferably, rocker arm 62 is longitudinally adjustable so as to allow repositioning of roller 59 with respect to control sphere 46. The biasing force applied to maintain control sphere 46 in the tetrahedronal retaining pocket can be varied in accordance with the type of compression spring 61 used.

The top surface 44 is preferably sloped at an average angle A relative to base 41, which it contacts at the proximal end of the multi-axis controller 40. Angle A can be from 1° to 60° and is preferably from 20° to 50°, and optimally 25° to 45°.

Figure 5:
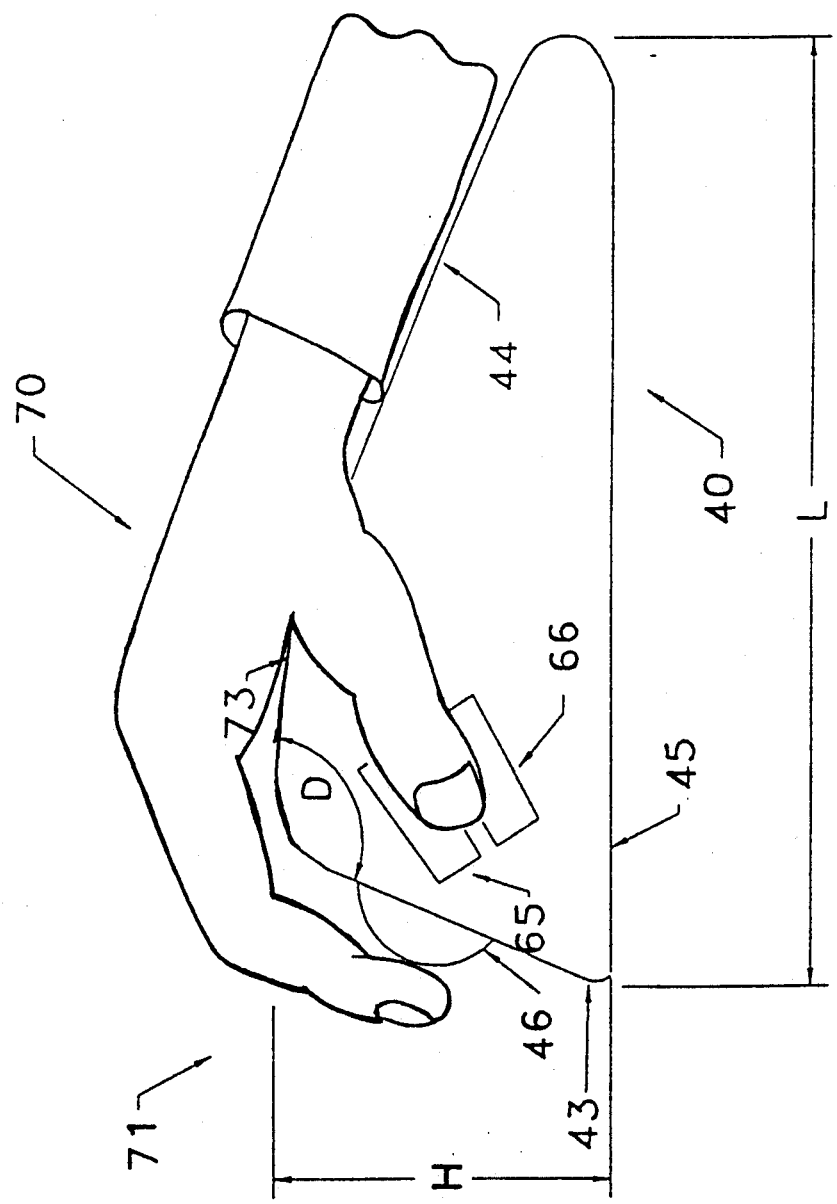
FIG. 5 illustrates use of the desk top trackball embodiment.

The front access face 43 and top surface 44 can be curved. Referring to FIG. 5, in use of the invention an operator will rest the palm 73 of his or her hand 70 on the top surface 44 such that at least the forefinger 71 and/or middle finger will overhang the front access face 43 so as to be able to contact the presented surface of the control ball 46, i.e. the surface of that portion of the control ball 46 which extends through aperture 43 to the outside of the upper portion 42. Angle D between the front access 43 and top surface 44 corresponds to the natural curvature of the human hand and can range from about 80° to about 140° with the preferred angle ranging from 90° to 120°. The distal portion of the palm as well as the proximal portion, or "heel" of the palm is adequately supported.

Secondary actuators 65 and 66 are positioned on side 45 of the upper portion in a location easily and naturally within the reach of the operator's thumb 72. Secondary actuators are well known and one skilled in the art would have many alternatives to choose from in incorporating one or more secondary actuators into the multi-axis controller of the present invention. Additionally, the secondary actuators can be used to input information as to the z coordinate direction.

Encoders such as x encoder 54 and y encoder 56 (FIGS. 3 and 4) are also known to those with skill in the art. Typically, such encoders can have a plurality of apertures, such as apertures 56a, around the periphery of the encoder for use with light signaling components. Examples of such encoders are described in U.S. Pat. Nos. 4,533,830, 3,304,434 and 3,541,521, all of which are herein incorporated by reference. Means for formatting data from the encoders and/or secondary actuators and transmitting the data to the controlled device or system (e.g., computers, microcontrollers, etc.) are also well known in the art.

The multi-axis controller 40 (FIG. 5) is configured and dimensioned so as to fit the size of the human hand. Generally, the length L of the controller is preferably 3 to 10 inches, the height H is preferably 2 to 4 inches. The control ball diameter is preferably about 1 to 4 inches, although any size appropriate to the functioning of the instrument may be used.

Figure 3A:
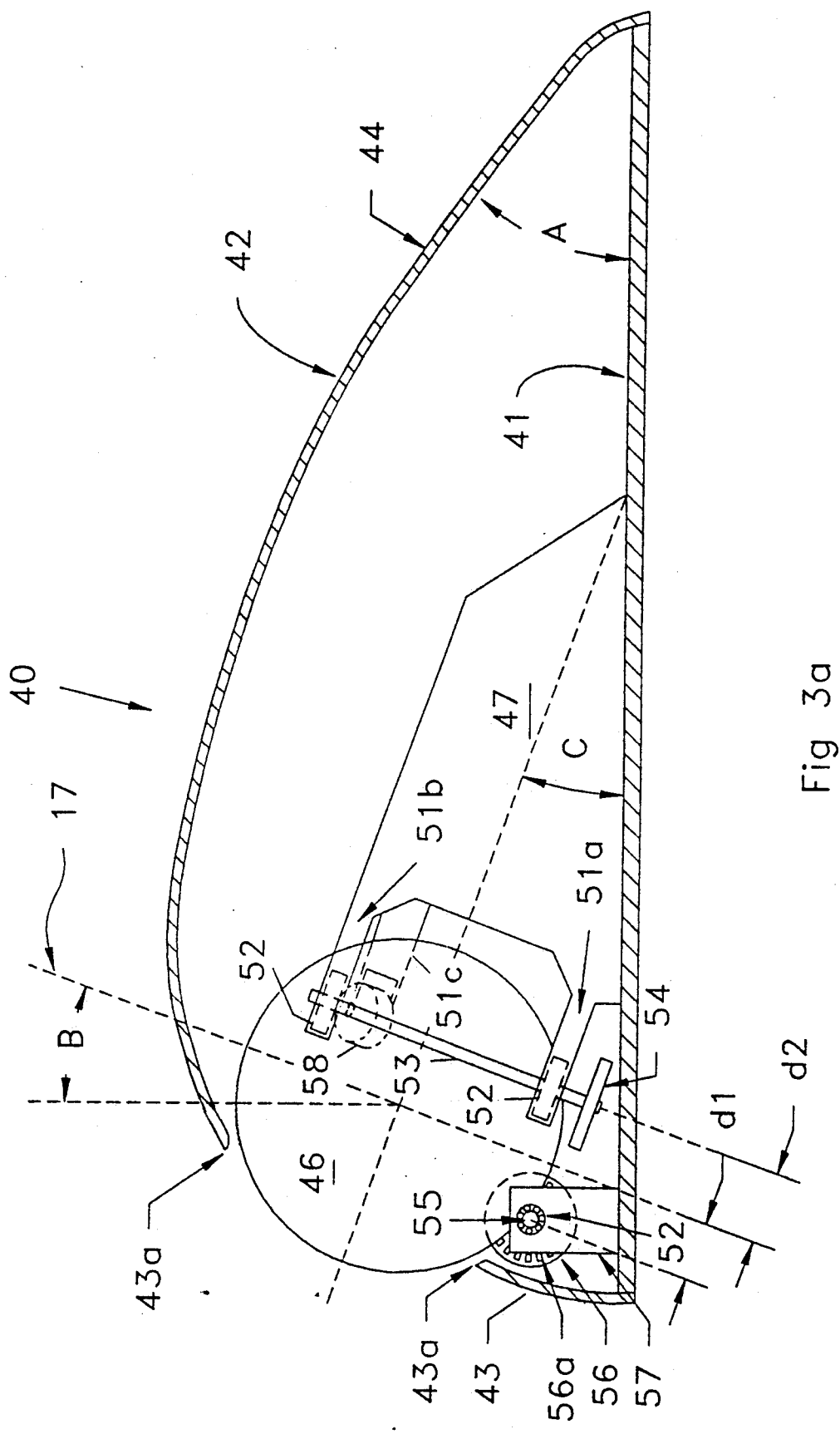
FIGS. 3a and 4a illustrate a desk top embodiment with a three point suspension system.
Figure 4:
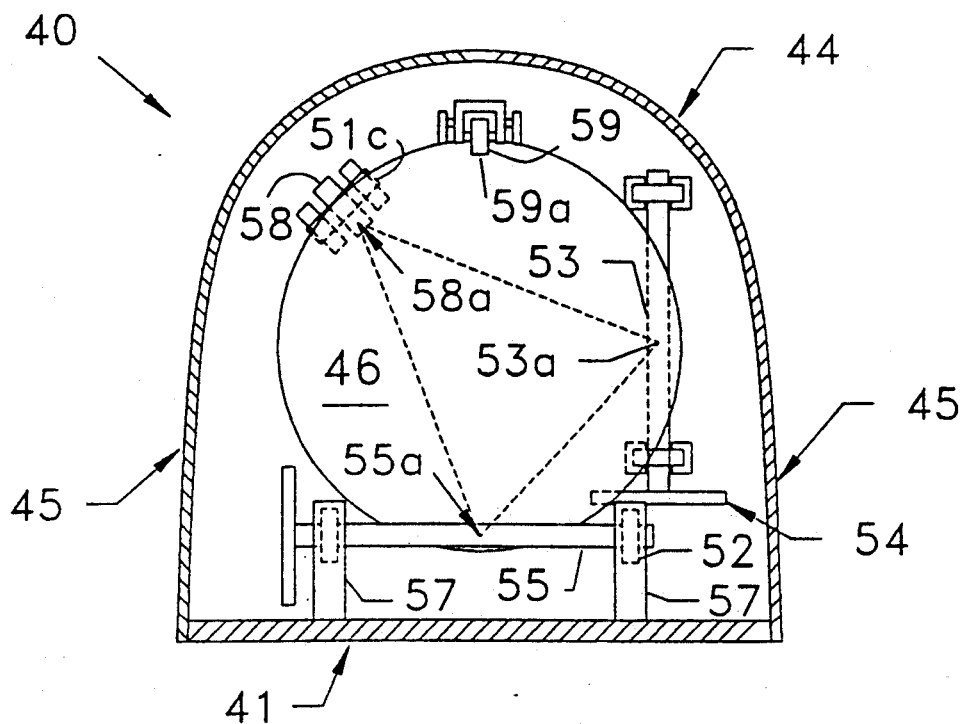
Figure 4A:
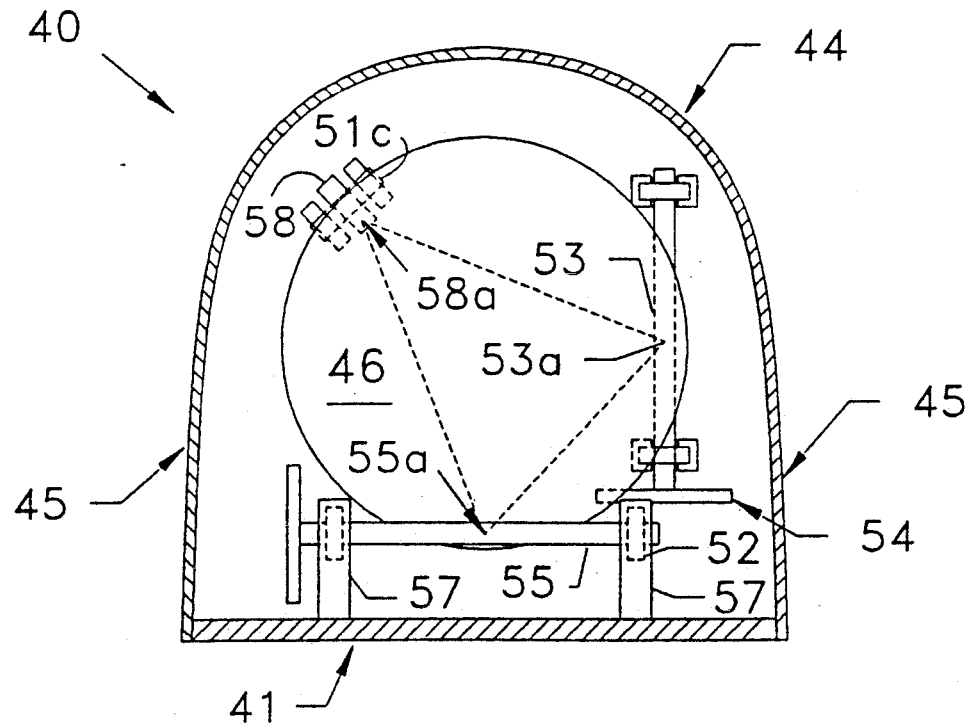

FIGS. 3a and 4a illustrate the multi-axis controller of the present invention which employs three contacting means rather than four, i.e., support roller 59 is optional.

In addition to trackball type controllers the present invention may be embodied in a control stick or "joystick" type controller. A joystick controller such as that described in U.S. Pat. No. 3,760,320, herein incorporated by reference in its entirety, may be mounted in the housing illustrated in FIGS. 3 to 5, such that the joystick rather than a trackball is located at the front access face and is actuated as shown in FIG. 5, i.e., by the operator's fingers overhanging the top of the controller. Actuation of the joystick of the above referenced panel entails pivoting the joystick from its central position. Pivoting from side to side, for example determines the x axis coordinates, whereas pivoting the joystick up and down determines y axis coordinates. The presentation angle in such a device is the angle between the horizontal, as defined by the base, and the z axis, which is defined by the unactuated joystick.

However, a preferred embodiment is described below wherein the joystick is slidably mounted rather than pivotally mounted. The x, y actuation of the preferred joystick controller is accomplished by translational movement of the primary actuator, i.e., the joystick, in an x, y plane. The joystick is biased to a central rest position by a cantilever spring.

Figure 6:
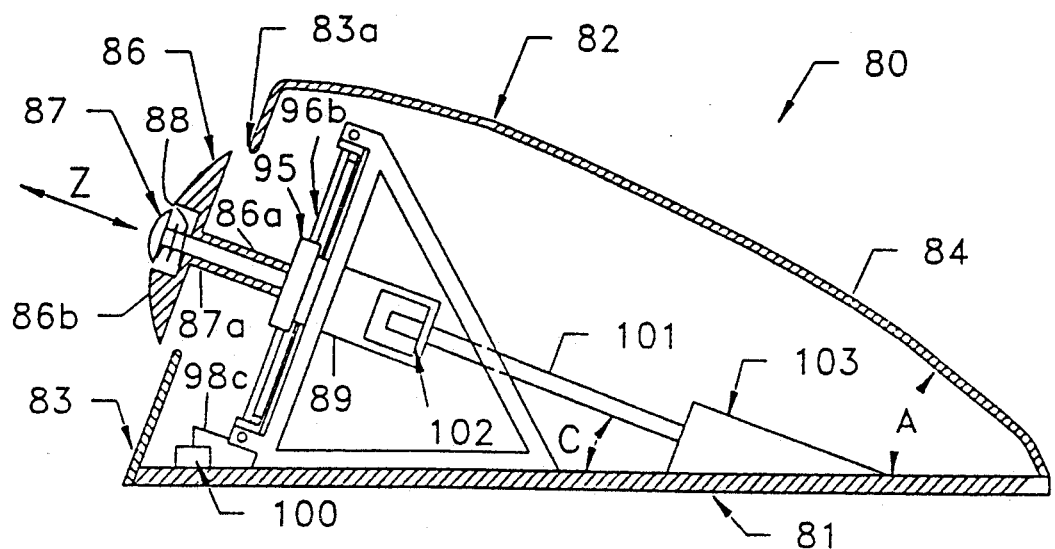
FIGS. 6 and 7 illustrate respectively a side elevational cutaway view, and a front elevational cutaway view of a joystick controlled embodiment of the present invention.
Figure 7:
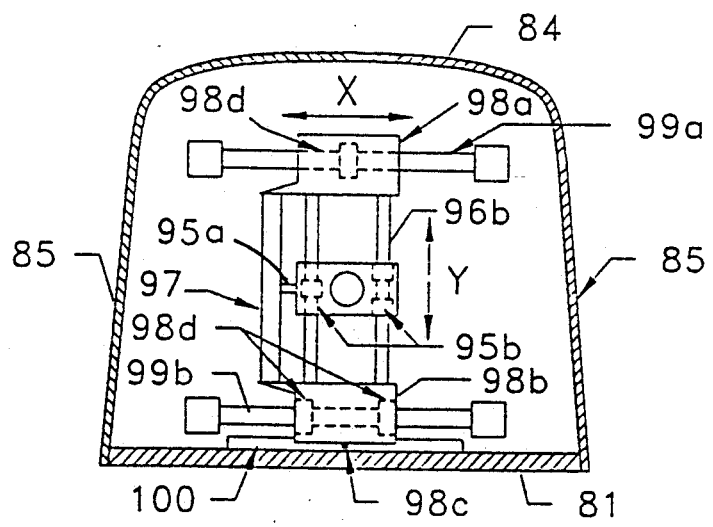

Referring to FIGS. 6 and 7, joystick type controller 80 includes a base 81 and upper portion 82 having a front access face 83, side surfaces 85, and top surface 84. Aperture 83a in the front access face allows passage therethrough of the joystick, i.e. x, y actuator 86. The top surface 84 joins base 81 at the proximal end of controller 80 and the angle A formed therebetween can range from 1° to 60°, more preferably 20° to 50° and optimally from about 25° to 45°. X-Y actuator 86 includes a relatively wide contact portion 86b mounted to shaft 86a. The contact portion 86b presents a control surface for receiving actuating contact by the user's finger. The control surface is positioned at the distal end of the joystick, as opposed to conventional joysticks which are usually operated by user contact of the sides of the stick. The contact portion 86b optionally includes a z axis actuator 87 by which the operator can input coordinate data with respect to z axis. The z axis actuator 87 can be a movable plunger type with a compression spring 88 to bias the z actuator distally. A z encoder 89 detects motion of the z actuator shaft 87a and generates a signal accordingly.

The x-y actuator 86 is mounted to member 95 which is slidably mounted by means of oiless bearings 95b to a pair of parallel rails 96a and 96b oriented in the y axis direction. Contact member 95a which is attached to member 95, contacts elongated y axis encoder 97 which generates a signal in accordance with the location of contact member 95 relative to the lengthwise extent of encoder 97, for example, by potentiometric means.

Parallel rails 96a and 96b are both fixed at their ends in members 98a and 98b, which are slidably mounted by means of oiless bearings 98d on parallel rails 99a and 99b respectively. Parallel rails 99a and 99b are oriented lengthwise in the x axis direction. Member 98b has a contact member 98c for contacting x axis encoder 100.

Member 95 is mounted to z axis encoder 89 which transform mechanical movement of the z actuator 87 to a signal for example by potentiometric means such that the signal is indicative of the magnitude of movement of the z actuator.

Referring to FIG. 7, cantilever spring 101 extends to mounting backstop 103 at its distal end. At its proximal end, cantilever spring 101 is mounted to cantilever bearing 102. Cantilever spring 101 extends at an angle C from base 81 Angle C is preferably from 0° to 60°, and more preferably from 20° to 35°.

Cantilever spring 101 is preferably fabricated from a resilient metal, although any material having suitable strength and resiliency for the purpose of this invention may be used.

The use of the cantilever spring 101 provides an important advantage to the operation of the joystick inasmuch as the biasing force of the spring is substantially uniform with respect to the direction in which the primary actuator is moved.

When cantilever spring 101 is unbent, angle C will be equal to the presentation angle, which has been defined as the angle at which the z axis is inclined from the horizontal. Vertical movement of the primary actuator 86 from the center position will slightly change angle C. However, the presentation angle will remain the same since the angle of primary actuator 86 relative to the base 81 does not change.

Figure 8:
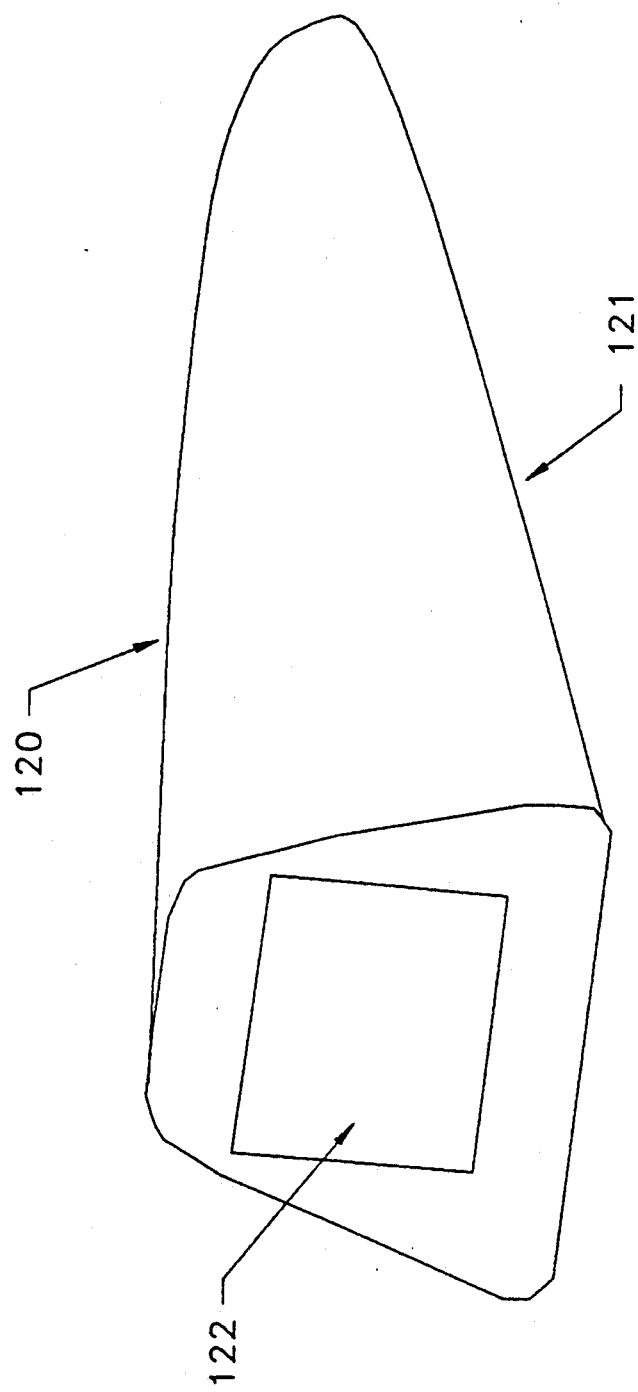
FIGS. 8 and 8a illustrate perspective and side elevational views, respectively, of an embodiment of the present invention employing a touch sensitive control pad as the primary actuator.
Figure 8A:
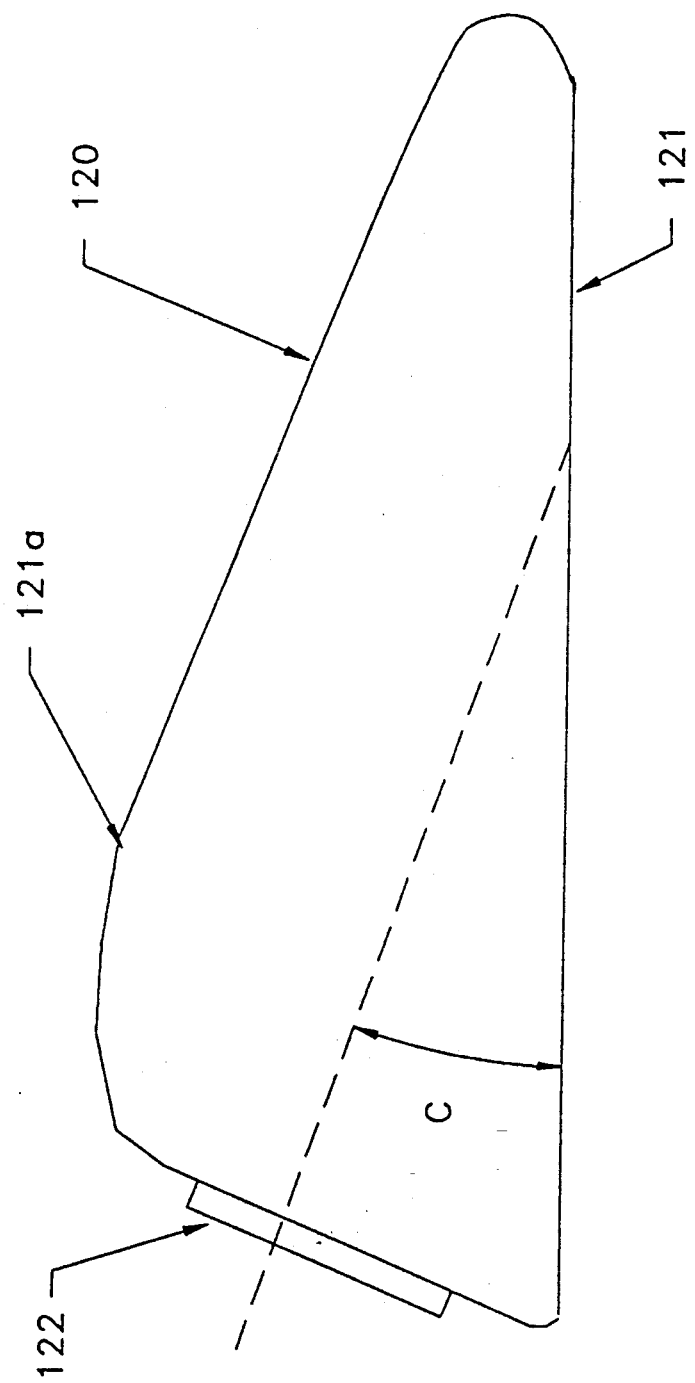

Referring to FIGS. 8 and 8a, the multi-axis controller of the present invention can employ control panels or surfaces as the primary actuator. Controller 120 includes a housing 121 having inclined surface 121a for providing support to the palm of the user's hand. Primary actuator 122 is a touch sensitive pad which senses the x y orientation of a point of pressure applied to its surface by, for example, the user's finger. Such pads are commonly available and well known in the art. The angle between a line extending perpendicularly to the x y plane of the pad and the horizontal or base line, defines the presentation angle C.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A manually operable multi-axis controller, which comprises:
    a housing having a base, and an upper portion having a forward access face and a top surface for supporting the hand of a user;
    a primary actuator for generating spatial coordinate information with respect to at least X and Y coordinate axes, and having a presentation angle for operation access of from about 0° to about 70°, said presentation angle being the angle at which a Z-coordinate axis is inclined from the horizontal, said Z-coordinate axis being orthogonal to both said X and Y axes, wherein said primary actuator is actuatable by a single user contact point;
    means for retaining said primary actuator at said forward access face at said presentation angle; and
    pick up means for generating and transmitting at least one signal in response to actuation of said primary actuator.

2. The multi-axis controller of claim 1 wherein said top surfaced and said base generally define an angle of from about 20 to about 50 degrees and said forward access face and said top surface generally define an angle of from about 80 to about 140 degrees.

3. The multi-axis controller of claim 1 wherein said forward access face includes an aperture through which said primary actuator at least partially projects.

4. The multi-axis controller of claim 1 wherein said primary actuator is a control sphere.

5. The multi-axis controller of claim 4, wherein said control sphere is rotatable around both said X and Y axes orthogonally oriented with respect to each other, said X and Y axes defining a plane, and said plane and said base defining an angle of from about 20 to about 90 degrees.

6. The multi-axis controller of claim 5 wherein said plane and said base define an angle of from about 65 to 70 degrees.

7. The multi-axis controller of claim 5 wherein the means for retaining said primary actuator comprise contacting means at first, second, third and fourth contact points on the surface of said control sphere, said first, second, third and fourth contact points being spaced apart in relative relationship so as to generally define a tetrahedron with each side being smaller in length than the diameter of the control sphere.

8. The multi-axis controller of claim 7 wherein the contacting means at said first, second, third and fourth contact points respectively are rotatable contacting means.

9. The multi-axis controller of claim 7 wherein the contacting means on at least two of said first, second, third and fourth contacting points are pick-up means for generating a signal in response to rotation of said primary actuator control sphere.

10. The multi-axis controller of claim 9 wherein said pick-up means each comprise a shaft axially oriented in parallel relationship to a respective one of the coordinate axes of rotation of said contact sphere, and an encoding means associated with said shaft.

11. The multi-axis controller of claim 1 wherein the primary actuator is a joystick.

12. The multi-axis controller of claim 11 wherein said means for retaining said joystick comprises: a joystick holder movable in one of either the x or y directions and movably mounted on a first support means, said first support means being movable in the other of the x or y directions and being movably mounted on a second support means orthogonally oriented with respect to said first rectilinear support means; and,
    means for biasing said joystick to a central position.

13. The multi-axis controller of claim 12 wherein said biasing means comprises a cantilever spring fixedly attached at its proximal end to the housing, and having a distal end connected to the joystick holder.

14. The multi-axis controller of claim 13 wherein said joystick comprises a distal contact surface for contact by the hand of an operator.

15. The multi-axis controller of claim 14 wherein said distal contact surface includes a portion for receiving applied pressure generally proximally directed onto said distal contact surface, said apparatus further comprising means for generating a signal in response to the applied pressure.

16. The multi-axis controller of claim 15 wherein said means for generating a signal in response to the applied pressure comprises a distally biased slidable member which is movable in a z axis direction in response to the applied pressure, and means for generating an electrical signal indicative of the magnitude of movement of the slidable member.

17. The multi-axis controller of claim 1 further including at least one side surface and at least one secondary actuator associated with said at least one side surface.

18. The multi-axis controller of claim 17 wherein said secondary actuator is a push button controller.

19. The multi-axis controller of claim 1 wherein said primary actuator comprises a touch sensitive control surface.

* * * * *